United States Patent
Berrer et al.

[11] 3,723,088
[45] Mar. 27, 1973

[54] HERBICIDAL COMPOSITIONS AND METHODS

[75] Inventors: Dagmar Berrer, Riehn/Baselstadt; Christian Vogel, Binningen/Baselland, both of Switzerland

[73] Assignee: Ciba-Geigy Corporation, Ardsley, N.Y.

[22] Filed: Oct. 28, 1970

[21] Appl. No.: 84,863

Related U.S. Application Data

[63] Continuation-in-part of Ser. No. 807,431, March 14, 1969, Pat. No. 3,583,987.

[30] Foreign Application Priority Data

Mar. 20, 1968 Switzerland..........................4148/68

[52] U.S. Cl.....................................................71/93
[51] Int. Cl. ...............................................A01n 9/22
[58] Field of Search..........................................71/93

[56] References Cited

UNITED STATES PATENTS

| | | | |
|---|---|---|---|
| 3,451,802 | 6/1969 | Neighbors et al. | 71/93 |
| 3,497,511 | 2/1970 | Schwarze et al. | 71/93 |
| 3,499,749 | 3/1970 | Nikles et al. | 71/93 |
| 3,620,710 | 11/1971 | Schwarze et al. | 71/93 |

Primary Examiner—James O. Thomas, Jr.
Attorney—Karl F. Jorda and Frederick H. Rabin

[57] ABSTRACT

Herbicidal compositions comprising azido-triazine derivatives of the formula

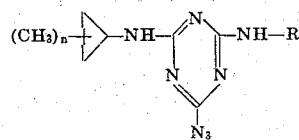

wherein $n$ means 0 or 1 and R represents certain unsubstituted or substituted alkyl groups having a total of from three to six carbon atoms as herbicidally active compounds of enhanced toxicity to undesirable plant growth and improved selectivity are disclosed. A method of controlling undesirable plant growth with such compounds and compositions containing them as the active ingredient are also described.

10 Claims, No Drawings

HERBICIDAL COMPOSITIONS AND METHODS

This application is a continuation-in-part of our patent application Ser. No. 807,431, filed on Mar. 14, 1969 now U.S. Pat. No. 3,583,987.

DESCRIPTION OF THE INVENTION

The present invention concerns new herbicidal s-triazine derivatives, processes for the production thereof, a method for controlling weeds and wild grasses with the aid of the new triazines, as well as compositions containing the new herbicidally active substances.

More particularly, the invention provides novel s-triazine derivatives of the Formula I

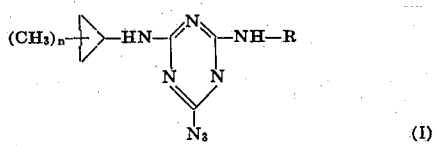

wherein
R represents sec-butyl, tert-butyl, isobutyl, β-methoxy-ethyl, 1-cyanoethyl, 1-cyanopropyl, 2-cyano-prop-(2)-yl, 2-cyanobut-(2)-yl, 3-cyanopent-(3)-yl or isopropyl, and
$n$ represents zero or 1,
which are produced by reacting a chloro-bis-amino-s-triazine of the Formula II

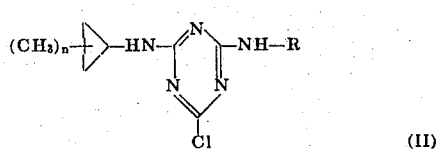

wherein R and $n$ have the meanings given under Formula I, with an alkali metal azide in the presence of a basic substance. Suitable as basic substances are especially tertiary amines such as trialkylamines, also hydroxides, oxides and carbonates of alkali metals and alkaline earth metals. Preferably water is used as the solvent or diluent for the reaction. It is also possible to use water-miscible organic solvents such as ketones, ethers and ethereal compounds, nitriles, N,N-disubstituted amides, sulphoxides etc., as well as solvents which are not miscible with water such as, for example, aliphatic and aromatic hydrocarbons and halogenated hydrocarbons.

The new s-triazines possess excellent herbicidal properties and can be used for controlling mono- and dicotyl weeds and wild grasses. In high concentrations, the active substances, according to the invention, act as total herbicides, and in lower concentrations act as selective herbicides. It is to be particularly emphasized that varieties of weeds, which are very difficult to control, as well as deep-rooted varieties such as grasses, leguminosae and umbel growth, are controlled by the new s-triazines. The usual s-triazine herbicides are applied mainly before the emergence of the plants (preemergence) and, applied after emergence of the plants (post-emergence), they show an effect often only after several weeks. Compared with this, already growing plants begin to wither and die off within a few days of application of the active substances according to the invention.

By virtue of their good action on weeds and wild grasses which are very difficult to control, the new s-triazines are especially valuable for agriculture. The usual crop rotation can be maintained after application of the active substances even in high dosages. Furthermore, cultivated plants can be subsequently sown during the vegetation period without germination being impeded. The new active substances are of particular value in controlling weeds in cultivations which have a short vegetation period.

Herbicidal compositions are produced by mixing the active substances with suitable carriers and/or distributing agents. In order to broaden the range of activity of the triazine derivatives according to the invention, to these compositions can further be admixed other herbicides, e.g. herbicides from the series of triazines such as other halogen-diamino-s-triazines, alkoxy- and alkylthio-diamino-s-triazines, triazoles, diazines such as uracils, aliphatic carboxylic acids and halogenated carboxylic acids, halogenated benzoic acids and phenyl acetic acids, aryloxyalkane carboxylic acids, hydrazides, amides, nitriles, esters of such carboxylic acids, carbamic acid esters and thiocarbamic acid esters, ureas etc..

The following non-limitative example illustrates the production of the new s-triazines. The temperatures are given in degrees centigrade.

EXAMPLE 4.4 ml of a aqueous 40%-trimethylamine solution are added dropwise to a solution of 8 g of 2-isopropylamino-4-chloro-6-cyclopropylamino-s-triazine in 30 ml of acetone. The reaction mixture is then stirred for 5 hours at room temperature and subsequently mixed dropwise with a solution of 2 g of sodium azide in 5 ml of water and is further stirred for 20 hours at room temperature. The mixture is then poured into 60 ml of cold water. The obtained precipitate is separated, dried and washed. The 4-azido-2-isopropylamino-6-cyclopropylamino-s-triazine, after recrystallization from petroleum ether, has the melting point 80°–85°.

The 4-azido-2,6-bis-amino-s-triazines, which are listed in the following table, were obtained in the manner described in the preceding example, using equimolar amounts of sodium azide and of the corresponding 4-chloro-2,6-bis-amino-s-triazine.

|  | M.P. |
|---|---|
| 4-azido-2-sec.butylamino-6-cyclopropylamino-s-triazine | 73°–78° |
| 4-azido-2-tert.butylamino-6-cyclopropylamino-s-triazine | 95°–97° |
| 4-azido-2-(β-methoxy-ethylamino)-6-cyclopropylamino-s-triazine | 93°–95° |
| 4-azido-2-(2'-cyanoprop-(2')-yl-amino)-6-cyclopropylamino-s-triazine | 119°–120° |
| 4-azido-2-isobutylamino-6-cyclopropylamino-s-triazine | 93°–94° |
| 4-azido-2-(2'-cyanobut-(2')-ylamino)-6-cyclopropylamino-s-triazine | 106°–108° |
| 4-azido-2-(2'-cyanoprop-(2')-ylamino)-6-(2''-methyl-cyclopropylamino)-s-triazine | 104°–106° |
| 4-azido-2-(2'-cyanoprop-(2')-ylamino)-6-(1''-methylcyclopropylamino)-s-triazine |  |
| 4-azido-2-(1'-cyanoethylamino) 6-cyclopropylamino-s-trizine | 121°–123° |

| | |
|---|---|
| 4-azido-2-(3'-cyanopent-(3')-ylamino)-6-cyclopropylamino-s-triazine | 112°–114° |
| 4-azido-2-(1'-cyanoprop-(1')-ylamino)-6-cyclopropylamino-s-triazine | 78°–80° |

The production of herbicidal agents according to the invention is carried out in a manner known per se by the mixing and grinding of active substances of the general Formula I with suitable carriers, optionally with the addition of dispersion agents or solvents which are inert to the active substances. The active substances can exist and be used in the following forms:
as solids: sprinkling agents, granulates, coated granules, impregnated granules and homogenous granules;
as concentrates of active substances dispersible in water: wettable powder, pastes, emulsions;
as liquids : solutions, aerosols.

The solid forms (sprinkling agents, granulates) are produced by mixing the active substances with solid carriers. The grain size of the carriers for sprinkling agents is about 0.075 to 0.2 mm and for granulates it is 0.2 mm or above. The concentrations of active substance in the solid preparations are as a rule 0.5 to 80 percent by weight. To these mixtures can also be added additives which stabilize the active substance and/or non-ionic as well as anion-active substances which, for example improve the adhesion of the active substances on plants and parts of plants (glues and adhesives) and/or ensure a better wettability (wetting agents) and also dispersibility (dispersing agents). Concentrates of active substances which can be dispersed in water, i.e. wettable powders, pastes and emulsion concentrates, are agents which can be diluted with water to give any desired concentration. They consist of active substance, carrier, optionally additives for stabilizing the active substance, surface active substances and antifoaming agents and, optionally, solvents. The concentration of active substance in these agents is 5–80 percent by weight.

The wettable powders and pastes are obtained by mixing and grinding the active substances with dispersing agents and pulverulent carriers in suitable apparatus until homogeneity is attained. Suitable antifoaming agents are, e.g. silicones etc.. The active substances are so mixed, ground, sieved and strained with the above mentioned additives that the solid particle size in the case of wettable powders does not exceed 0.02–0.04 mm and in the case of pastes 0.003 mm. Emulsion concentrates and pastes are produced by using dispersing agents, organic solvents and water. The solvents must be practically without smell, not phytotoxic, inert to the active substances and not easily inflammable.

Furthermore, the agents according to the invention can be used in the form of solutions. For this application, the active substance or substances of the general formula I are dissolved in suitable organic solvents, mixtures of solvents or in water. The solutions are to contain the active substances within a concentration range of 1 – 20 percent by weight.

Other biocidal active substances or agents can be mixed with the described agents according to the invention. Thus in addition to the stated compounds of the general formula I and other herbicides, the new agents can also contain, e.g. insecticides, fungicides, bactericides, fungistatics, bacteriostatics or nematocides, in order to widen the range of action. The agents according to the invention can also contain fertilizers, trace elements etc..

Forms of preparation of these active substances are described in the following. Unless otherwise expressly stated, all "parts" and percentages are by weight.

Granulate

The following substances are used to produce a 5 % granulate:
  5 parts of 4-azido-2-(2'-cyanoprop-(2')-ylamino)-6-cyclopropylamino-s-triazine,
  0.25 parts of epichlorohydrin,
  0.25 parts of cetyl polyglycol ether, with 8 mol ethylenoxide
  3.50 parts of Carbowax (molecular weight about 400)
  91 parts of kaolin (grain size 0.3 – 0.8 mm).

The active substance is mixed with epichlorohydrin and dissolved with six parts of acetone. Polyglycol and cetyl polyglycol ether are then added. The thus obtained solution is sprayed on to kaolin and the acetone is then evaporated in vacuo.

Wettable powder

The following constituents are used to produce
  a. a 50 percent wettable powder,
  b. a 25 percent wettable powder and
  c. a 10 percent wettable powder:
  a. 50 parts of 4-azido-2-tert.butylamino-6-cyclopropylamino-s-triazine,
    5 parts of sodium dibutyl naphthyl sulphonate,
    3 parts of naphthalene sulphonic acid /phenolsulphonic/ formaldehyde condensate 3:2:1
    20 parts of kaolin,
    22 parts of Champagne chalk;
  b. 25 parts of 4-azido-2-(2'-methoxyethylamino)-6-cyclopropylamino-s-triazine,
    5 parts of oleyl-methyl tauride-Na-salt,
    2.5 parts of naphthalene sulphonic acid /formaldehyde condensate,
    0.5 parts of carboxy-methyl cellulose,
    5 parts of neutral potassium aluminum silicate,
    62 parts of kaolin;
  c. 10 parts of 4-azido-2-isobutylamino-6-cyclopropylamino-s-triazine,
    3 parts of a mixture of the sodium salts of saturated fatty alcohol sulphates,
    5 parts of naphthalene sulphonic acid / formaldehyde condensate,
    82 parts of kaolin;

The stated active substance is drawn on to the corresponding carriers (kaolin, chalk) and subsequently mixed and ground. A wettable powder is obtained having excellent wettability and suspension properties. Suspensions of any desired active substance concentration can be prepared from such a wettable powder by diluting with water.

Paste

The following substances are used to produce a 45 percent paste:
  45 parts of 4-azido-2-(2'-cyanoprop-2')-ylamino)-6-cyclopropylamino-s-triazine,
  5 parts of sodium aluminum silicate,
  14 parts of cetyl polyglycol ether with 8 mol ethylenoxide 1 part of cetyl polyglycol ether with 5 mol ethylenoxide 2 parts of spindle oil, 10 parts of Carbowax (molecular weight about 400)

23 parts of water.

The active substance is intimately mixed and ground with the additives in suitable devices. A paste is obtained from which, by dilution with water, suspensions of any desired concentration can be produced.

Emulsion concentrate

The following are mixed together to produce a 10 % emulsion concentrate:

10 parts of 4-azido-2-tert.butylamino-6-cyclopropylamino-s-triazine, 15 parts of oleyl polyglycol ether with 8 mol of ethylene oxide, 75 parts of isophorone(3-methyl-5,5-dimethyl-cyclohex-2-en-1-one)

This concentrate can be diluted with water to obtain emulsions of suitable concentrations. Such emulsions are suitable for the controlling of weeds in cultivated plantations.

The herbicidal action of the 4-azido-2,6-bis-amino-s-triazines is shown in the following test reports:

I. Pre-emergence Test in Greenhouse (total effect)

Method

The active substance is mixed with an inert carrier in a ratio of 1:9 and the 10 percent preparation thus obtained is mixed with garden soil. Application concentration is 0.5 g of active substance per liter of soil. Flower pots are filled with the test soil, and then oats, vetch, cucumbers, cotton and maize are sown therein as test plants. The growth of the plants is evaluated after 3 weeks and expressed according to the following scale:

10 represents undamaged plants (same as untreated plants),

9 - 1 represent intermediate degrees of damage, 0 represents complete destruction of all plants.

Test Substances

I    4-azido-2-(1'-methyl-1'-cyanoethylamino)-6-cyclopropyl-amino-s-triazine(according to the invention)

II    4-azido-2-(β-methoxy-ethylamino)-6-cyclopropylamino-s-triazin (according to the invention)

III    4-azido-2-(1'-methyl-1'-cyanoethylamino)-6-isopropyl-amino-s-triazine(known from published South African Patent Application No.67/7036)

Results

| Test Substance | oats | vetch | cucmbers | cotton | maize |
|---|---|---|---|---|---|
| I | 0 | 0 | 0 | 0 | 0 |
| II | 0 | 0 | 0 | 0 | 0 |
| III | 2 | 6 | 4 | 8 | 10 |

II. Post-emergence Test (selective effect)

Method

The test plants are sown in a freshly prepared seed bed. 22 Days after emergence of the plants, the active substance is applied as an aqueous dispersion prepared from a 25 percent wettable powder. The phytotoxic effect on the cultivated plants and the herbicidal effect on the weeds is ascertained 21 days after treatment.

Test Substances

I    4-azido-2-(1'-methyl-1'-cyanoethylamino)-6-cyclopropyl-amino-s-triazine(according to the invention)

II    4-azido-2-(1'-methyl-1'-cyanoethylamino)-6-isopropyl-amino-s-triazine(known from published South African Patent Application No.67/7036)

Weeds

Indigenous weeds:

*Amaranthus retroflexus, Chenopodium album, Polygonum persicasia, Galiusega parviflora* and *Solanum nigrum*.

Cultivated Plants

Summer wheat, winter wheat, ray grass.

Results

In the following table the herbicidal effect on the weeds is given in percent, calculated on the control plants. For the selectivity, the concentration limits at which reversible phytotoxic symptoms appear on the cultivated plants are given in kilogram per hectare (kg/ha).

| Test substance | Herbicidal effect on indigenous weeds in % at concentrations (kg/ha) of | | | Selectivity: Concentration Limit in kg/ha | | |
|---|---|---|---|---|---|---|
| | 2 | 1 | 0.5 | summer Wheat | Winter Wheat | Ray Grass |
| I | 90 | 90 | 70 | 1.5 | 1.5 | 2 |
| II | 70 | 55 | 30 | * | * | * |

* Evaluation is impossible, since the herbicidal effect on the indigenous weeds is insufficient.

The compositions according to the invention described hereinbefore, which contain a compound of Formula I as active ingredient, are applied in herbicidally effective amounts to the soil; i.e. in the case of selective weed control, amounts of from 0.5 up to 2.5 kg, depending on the type of cultivated plant, are recommended per hectare of treated soil, whereas, in the case of total destruction of plant growth being desired, higher amounts can be applied.

We claim:

1. A composition comprising a herbicidally effective amount of a compound of the formula

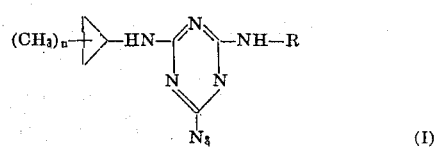

(I)

wherein

R represents sec-butyl, tert-butyl, isobutyl, β-methoxy-ethyl, 1-cyanoethyl, 1-cyanopropyl, 2-cyanoprop-(2)-yl, 2-cyanobut-(2)-yl, 3-cyanopent-(3)-yl or isopropyl, and n represents 0 or 1, and agriculturally acceptable carrier and/or dispersing agent.

2. A composition as defined in claim 1, wherein said compound is 4-azido-2-(2'-cyanoprop-(2')-ylamino)-6-cyclopropyl-amino-s-triazine.

3. A composition as defined in claim 1, wherein said compound is 4-azido-2-(β-methoxy-ethylamino)-6-cyclopropyl-amino-s-triazine.

4. A composition as defined in claim 1 wherein said compound is 4-azido-2-isobutylamino-6-cyclopropylamino-s-triazine.

5. A composition as defined in claim 1, wherein said compound is 4-azido-2-tert-butylamino-6-cyclopropylamino-s-triazine.

6. A method for controlling weeds and wild grasses which comprises applying to such weeds and wild grasses a composition-of-matter comprising a herbicidally effective amount of a compound as defined in Claim 1.

7. A method as described in claim 6, wherein said compound is 4-azido-2-(2'-cyanoprop-(2')-ylamino)-6-cyclopropylamino-s-triazine.

8. A method as described in claim 6, wherein said compound is 4-azido-2-($\beta$-methoxy-ethylamino)-6-cyclopropylamino-s-triazine.

9. A method as described in claim 6, wherein said compound is 4-azido-2-isobutylamino-6-cyclopropylamino-s-triazine.

10. A method as described in claim 6, wherein said compound is 4-azido-2-tert-butylamino-6-cyclopropylamino-s-triazine.

* * * * *